US010294329B2

(12) United States Patent
Kalyanaraman

(10) Patent No.: US 10,294,329 B2
(45) Date of Patent: May 21, 2019

(54) POLYIMIDE-FORMING COMPOSITIONS, METHODS OF MANUFACTURE, AND ARTICLES PREPARED THEREFROM

(71) Applicant: SABIC GLOBAL TECHNOLOGIES B.V., Bergen op Zoom (NL)

(72) Inventor: Viswanathan Kalyanaraman, Newburgh, IN (US)

(73) Assignee: SABIC GLOBAL TECHNOLOGIES B.V., Bergen op Zoom ( * ) Notice: Subject to any disclaimer, the term of this patent is extended or adjusted under 35 U.S.C. 154(b) by 0 days.

(21) Appl. No.: 15/538,820

(22) PCT Filed: Dec. 22, 2015

(86) PCT No.: PCT/US2015/067392

§ 371 (c)(1),
(2) Date: Jun. 22, 2017

(87) PCT Pub. No.: WO2016/109343

PCT Pub. Date: Jul. 7, 2016

(65) Prior Publication Data

US 2017/0362384 A1 Dec. 21, 2017

Related U.S. Application Data

(60) Provisional application No. 62/098,409, filed on Dec. 31, 2014.

(51) Int. Cl.

| | |
|---|---|
| ***C08G 73/10*** | (2006.01) |
| ***C09D 179/08*** | (2006.01) |
| ***B29B 11/14*** | (2006.01) |
| ***C08J 7/14*** | (2006.01) |
| ***C08K 5/00*** | (2006.01) |
| *B29K 79/00* | (2006.01) |

(52) U.S. Cl.

CPC .......... *C08G 73/1028* (2013.01); *B29B 11/14* (2013.01); *C08J 7/14* (2013.01); *C08K 5/0008* (2013.01); *C09D 179/085* (2013.01); *B29K 2079/085* (2013.01); *B29K 2896/02* (2013.01); *B29K 2896/04* (2013.01)

(58) Field of Classification Search

CPC ........................ C09D 179/08; G01N 33/54346

See application file for complete search history.

(56) References Cited

U.S. PATENT DOCUMENTS

| | | | | |
|---|---|---|---|---|
| 3,787,338 | A | 1/1974 | Skelly et al. | |
| 4,049,863 | A * | 9/1977 | Vassiliou | C08L 79/08 427/388.1 |
| 6,214,923 | B1 | 4/2001 | Goto et al. | |
| 6,432,348 | B1 * | 8/2002 | Yamanaka | C09D 5/4419 264/446 |
| 2008/0300360 | A1 | 12/2008 | Lubowitz et al. | |
| 2011/0300381 | A1 | 12/2011 | Bergerat et al. | |

OTHER PUBLICATIONS

Daniels et al.; Polymer Colloids ACS Symposium Series; American Chemical Society: Washington, DC, Dec. 2001.*

PTFE DISP 30 Fluoropolymer Resin MSDS, Dupont, published on Nov. 29, 2011.*

International Search Report for International Application No. PCT/US2015/067392; International filing date: Dec. 22, 2015; dated Mar. 7, 2016; 5 pages.

Written Opinion of the International Searching Authority for International Application No. PCT/US2015/067392; International filing date: Dec. 22, 2015; dated Mar. 7, 2016; 8 pages.

* cited by examiner

*Primary Examiner* — Gregory Listvoyb

(74) *Attorney, Agent, or Firm* — Cantor Colburn LLP

(57) ABSTRACT

A polyimide-forming composition includes a particulate polyimide precursor composition having an average particle size of 0.1 to 100 micrometers wherein the polyimide precursor composition comprises a substituted or unsubstituted $C_{4-40}$ bisanhydride, and a substituted or unsubstituted divalent $C_{1-20}$ diamine; an aqueous carrier; and a surfactant. A method of manufacturing an article including a polyimide includes the steps of forming a preform comprising the polyimide-forming composition; and heating the preform at a temperature and for a period of time effective to imidize the polyimide precursor composition and form the polyimide. An article prepared by the method, and a layer or coating including a polyimide and a surfactant are also described.

10 Claims, No Drawings

POLYIMIDE-FORMING COMPOSITIONS, METHODS OF MANUFACTURE, AND ARTICLES PREPARED THEREFROM

CROSS-REFERENCE TO RELATED APPLICATIONS

This application is a National Stage application of PCT/US2015/067392, filed Dec. 22, 2015, which claims the benefit of U.S. Provisional Application No. 62/098,409, filed Dec. 31, 2014, both of which are incorporated by reference herein in their entirety.

BACKGROUND

Polyimides, in particular polyetherimides (PEI) are amorphous, transparent, high performance polymers having a glass transition temperature (Tg) of greater than 180° C. Polyetherimides further have high strength, toughness, heat resistance, and modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

However, they are typically high viscosity materials and the high viscosity, combined with the high Tg, can hinder the use of polyetherimides in certain manufacturing operations, such as the manufacture of composites and coatings. For example, because of the high Tg of polyimides, formation of intricate parts or highly conformal coatings requires high temperatures that may not be compatible with other components. Composites, coatings, and thin films are currently manufactured using polymer solutions containing organic solvents, which adds removal and recycling costs. Residual solvent can be a further issue in certain applications, particularly the electronics industry.

There accordingly still remains a continuing need for new methods of manufacturing polyetherimides and articles comprising the polyetherimides, particularly methods that do not rely on organic solvents.

BRIEF DESCRIPTION

A polyimide-forming composition comprises a particulate polyimide precursor composition having an average particle size of 0.1 to 100 micrometers wherein the polyimide precursor composition comprises a substituted or unsubstituted $C_{4-40}$ bisanhydride, and a substituted or unsubstituted divalent $C_{1-20}$ diamine; an aqueous carrier; and a surfactant.

A method of manufacturing an article comprising a polyimide comprises forming a preform comprising the polyimide-forming composition; and heating the preform at a temperature and for a period of time effective to imidize the polyimide precursor composition and form the polyimide.

An article is prepared by the above-described method.

A layer or coating comprises a polyimide and from 0.001 to 5 weight percent (wt %) of a surfactant.

The above described and other features are exemplified by the following detailed description.

DETAILED DESCRIPTION

Described herein is a method for manufacturing a polyimide, for example a thin layer or conformal coating, that does not use an organic solvent to dissolve the polyimide. In particular, the polyimide is manufactured from an aqueous suspension of particulate polyimide precursors. It has been unexpectedly found by the inventors hereof that the aqueous particulate suspension can be used to form a layer or a coating, and the precursors subsequently imidized in situ. The method is environmentally friendly, and allows very thin layers to be obtained. In another advantageous feature, the polyimide can be formed in the absence of a chain terminating agent, allowing high molecular weights to be obtained. Other components, such as crosslinkers, particulate fillers, and the like can be present. The method is useful not only for layers and coatings, but also for composites.

The polyimide-forming composition comprises a particulate polyimide precursor composition having an average particle size of 0.01 to 100 micrometers; an aqueous carrier; and a surfactant.

The particulate polyimide precursor composition comprises a substituted or unsubstituted $C_{4-40}$ bisanhydride monomer and a substituted or unsubstituted divalent $C_{1-20}$ diamine monomer as described in further detail below. The monomers are in particulate form. In an embodiment, the particles have D100 of 100 micrometers or less, 75 micrometers or less, or 45 micrometers or less. As used herein "D100" means that 100% of the particles have a size distribution less than or equal to the named value. In another embodiment, the particles have can have a particle size of 0.01 to 100 micrometers, 0.01 to 75 micrometers, or 0.01 to 45 micrometers. A bimodal, trimodal, or higher particle size distribution can be used. The monomers can be present in the particulates separately (i.e., particles comprising the bisanhydride and particles comprising the diamine) or as a mixture (i.e., particles comprising a combination of the bisanhydride and the diamine). The monomers can be reduced to the desired particle size by methods known in the art, for example grinding and sieving. Other milling techniques are known, for example jet milling, which subjects the particles to a pressurized stream of gas and particle size is reduced by interparticle collisions.

The relative ratios of the bisanhydride and the diamine can be varied depending on the desired properties of the polyimides. Use of an excess of either monomer can result in a polymer having functionalized end groups. For example, a mole ratio of the bisanhydride to the diamine can be 1.3:1 to 1:1.3, preferably 0.95:1 to 1:0.95. In an embodiment, a mole ratio of the bisanhydride to the diamine can be 1:1 to 1:1.3, preferably 1:1 to 1:1.2 or 1:1 to 1:1.1. In another embodiment, a mole ratio of the diamine to the bisanhydride is 1:1 to 1:1.3, preferably 1:1 to 1:1.2 or 1:1 to 1:1.1.

The polyimides are prepared from bisanhydrides of formula (1)

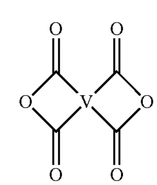

(1)

wherein V is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

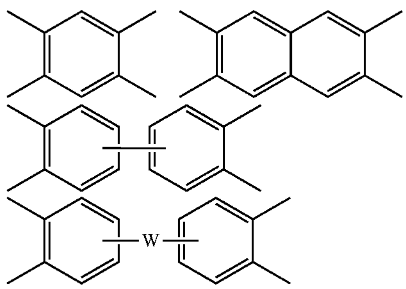

wherein W is —O—, —S—, —C(O)—, —$SO_2$—, —SO—, —$C_yH_{2y}$— wherein y is an integer from 1 to 5 or a halogenated derivative thereof (which includes perfluoroalkylene groups), or a group of the formula T as described in formula (2) below.

The polyimides include polyetherimides. Polyetherimides are prepared by the reaction of an aromatic bis(ether anhydride) of formula (2)

(2)

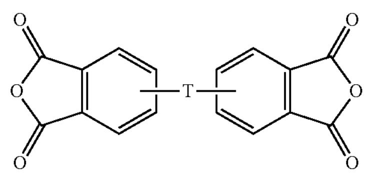

wherein T is —O— or a group of the formula —O—Z—O— wherein the divalent bonds of the —O— or the —O—Z—O— group are in the 3,3',3,4',4,3', or the 4,4' positions. The group Z in —O—Z—O— of formula (1) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (4)

(3)

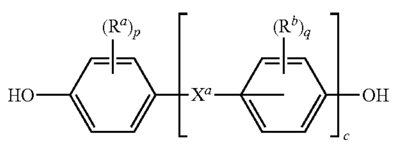

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —$SO_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

(3a)

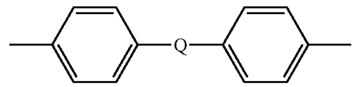

wherein Q is —O—, —S—, —C(O)—, —$SO_2$—, —SO—, or —$C_yH_{2y}$— wherein y is an integer from 1 to 5 or a halogenated derivative thereof (including a perfluoroalkylene group). In a specific embodiment Z is derived from bisphenol A, such that Q in formula (3a) is 2,2-isopropylidene.

Illustrative examples of bis(anhydride)s include 3,3-bis[4-(3,4-dicarboxyphenoxy)phenyl]propane bisanhydride; 4,4'-bis(3,4-dicarboxyphenoxy)diphenyl ether bisanhydride; 4,4'-bis(3,4-dicarboxyphenoxy)diphenyl sulfide bisanhydride; 4,4'-bis(3,4-dicarboxyphenoxy)benzophenone bisanhydride; 4,4'-bis(3,4-dicarboxyphenoxy)diphenyl sulfone bisanhydride; 2,2-bis[4-(2,3-dicarboxyphenoxy)phenyl]propane bisanhydride; 4,4'-bis(2,3-dicarboxyphenoxy)diphenyl ether bisanhydride; 4,4'-bis(2,3-dicarboxyphenoxy)diphenyl sulfide bisanhydride; 4,4'-bis(2,3-dicarboxyphenoxy)benzophenone bisanhydride; 4,4'-bis(2,3-dicarboxyphenoxy)diphenyl sulfone bisanhydride; 4-(2,3-dicarboxyphenoxy)-4'-(3,4-dicarboxyphenoxy)diphenyl-2,2-propane bisanhydride; 4-(2,3-dicarboxyphenoxy)-4'-(3,4-dicarboxyphenoxy)diphenyl ether bisanhydride; 4-(2,3-dicarboxyphenoxy)-4'-(3,4-dicarboxyphenoxy)diphenyl sulfide bisanhydride; 4-(2,3-dicarboxyphenoxy)-4'-(3,4-dicarboxyphenoxy) benzophenone bisanhydride; and, 4-(2,3-dicarboxyphenoxy)-4'-(3,4-dicarboxyphenoxy)diphenyl sulfone bisanhydride, as well as various combinations thereof.

The bisanhydrides can be reacted with an organic diamine of formula (4)

$$H_2N—R—NH_2 \quad (4)$$

wherein R a substituted or unsubstituted divalent $C_{1-20}$ hydrocarbon group, such as a substituted or unsubstituted $C_{6-20}$ aromatic hydrocarbon group or a halogenated derivative thereof, a substituted or unsubstituted, straight or branched chain, saturated or unsaturated $C_{2-20}$ alkylene group or a halogenated derivative thereof, a substituted or unsubstituted $C_{3-8}$ cycloalkylene group or halogenated derivative thereof, in particular a divalent group of formula (5)

(5)

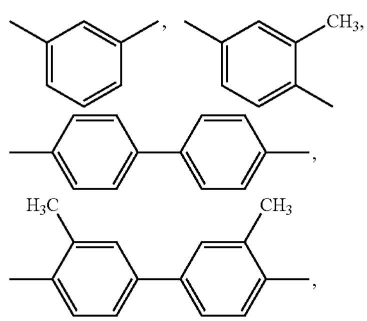

-continued

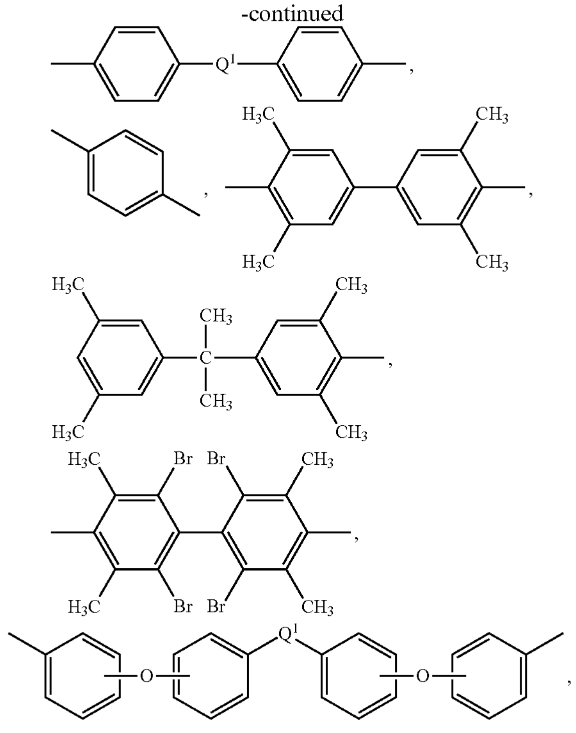

wherein $Q^1$ is —O—, —S—, —C(O)—, —$SO_2$—, —SO—, —$C_yH_{2y}$— wherein y is an integer from 1 to 5 or a halogenated derivative thereof (which includes perfluoroalkylene groups), or —$(C_6H_{10})_z$— wherein z is an integer from 1 to 4. In an embodiment R is m-phenylene, p-phenylene, or 4,4'-diphenylene sulfone. In some embodiments, no R groups contain sulfone groups. In another embodiment, at least 10 mol % of the R groups contain sulfone groups, for example 10 to 80 wt % of the R groups contain sulfone groups, in particular 4,4'-diphenylene sulfone groups.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, and bis(4-aminophenyl) ether. Combinations of these compounds can also be used. In some embodiments the organic diamine is m-phenylenediamine, p-phenylenediamine, 4,4'-sulfonyl dianiline, or a combination comprising one or more of the foregoing.

In some embodiments, the aromatic bisanhydride of formula (1) or (2) can be reacted with a diamine component comprising an organic diamine (4) as described above or mixture of diamines, and a polysiloxane diamine of formula (5)

(5)

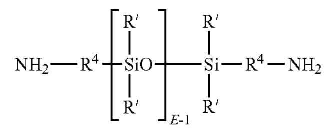

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R' groups can be used in the same copolymer. In an embodiment, the polysiloxane diamine comprises R' groups that have minimal hydrocarbon content, e.g., a methyl group E in formula (5) has an average value of 5 to 100, and each $R^4$ is independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (7) are well known in the art.

The diamine component can contain 10 to 90 mole percent (mol %), or 20 to 50 mol %, or 25 to 40 mol % of polysiloxane diamine (5) and 10 to 90 mol %, or 50 to 80 mol %, or 60 to 75 mol % of diamine (4). The diamine components can be physically mixed prior to reaction with the bisanhydride(s), thus forming a substantially random copolymer. Alternatively, block or alternating copolymers can be formed by selective reaction of (4) and (7) with aromatic bis(ether anhydride)s (1) or (2), to make polyimide blocks that are subsequently reacted together. Thus, the polyimide-siloxane copolymer can be a block, random, or graft copolymer.

The polyimides formed from the precursor compositions accordingly comprise more than 1, for example 10 to 1000, or 10 to 500, structural units of formula (8)

(8)

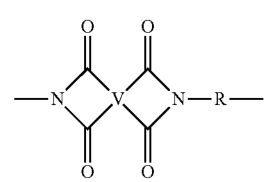

wherein each V is the same or different, and is as described in formula (1), and each R is the same or different, and is defined as in formula (5). The polyetherimides comprise more than 1, for example 10 to 1000, or 10 to 500, structural units of formula (9)

(9)

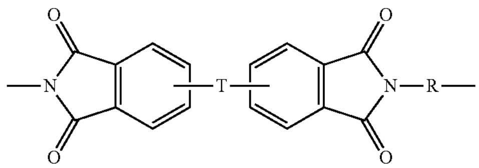

wherein each T is the same or different, and is as described in formula (2), and each R is the same or different, and is as described in formula (1), preferably m-phenylene or p-phenylene.

The polyetherimides can optionally further comprise up to 10 mole %, up to 5 mole %, or up to 2 mole % of units of formula (9) wherein T is a linker of the formula

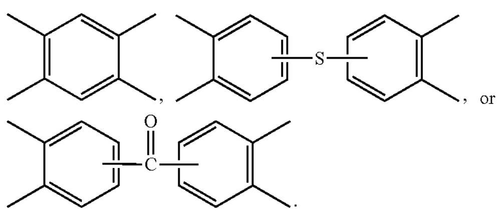

In some embodiments no units are present wherein R is of these formulas.

In an embodiment in formula (1), R is m-phenylene or p-phenylene and T is —O—Z—O— wherein Z is a divalent group of formula (3a). Alternatively, R is m-phenylene or p-phenylene and T is —O—Z—O wherein Z is a divalent group of formula (3a) and Q is 2,2-isopropylidene.

In an embodiment, the polyetherimide can be a polyetherimide sulfone. For example, the polyetherimide can comprise the etherimide units wherein at least 10 mole percent, for example 10 to 90 mole percent, 10 to 80 mole percent, 20 to 70 mole percent, or 20 to 60 mole percent of the R groups comprise a sulfone group. For example, R can be 4,4'-diphenylene sulfone, and Z can be 4,4'-diphenylene isopropylidene, providing units of the following formula.

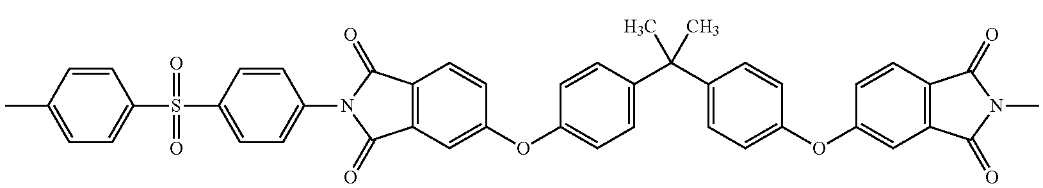

In another embodiment the polyetherimide can be a polyetherimide-siloxane block or graft copolymer. Block polyimide-siloxane copolymers comprise imide units and siloxane blocks in the polymer backbone. Block polyetherimide-siloxane copolymers comprise etherimide units and siloxane blocks in the polymer backbone. The imide or etherimide units and the siloxane blocks can be present in random order, as blocks (i.e., AABB), alternating (i.e., ABAB), or a combination thereof. Graft copolymers are non-linear copolymers comprising the siloxane blocks connected to linear or branched polymer backbone comprising imide or etherimide blocks.

In an embodiment, a polyetherimide-siloxane has units of the formula

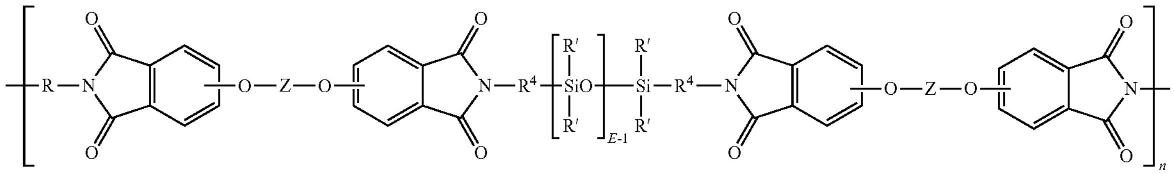

wherein R' and E of the siloxane are as in formula (6), the R and Z of the imide are as in formula (1), $R^4$ is the same as $R^4$ as in formula (7), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl. In an embodiment the polyetherimide-siloxane comprises 10 to 50 weight %, 10 to 40 weight %, or 20 to 35 weight % polysiloxane units, based on the total weight of the polyetherimide-siloxane.

The polyimide-forming composition further comprises an aqueous carrier for the particulate precursor composition. Small amounts of an organic solvent can be present, for example 0.1 to 5 wt % of an organic solvent, wherein the organic solvent is a protic or nonprotic organic solvent. Possible protic organic solvents include $C_{1-6}$ alkyl alcohols wherein the alkyl group is linear or branched. In an embodiment, the aliphatic alcohol is substantially miscible with water, e.g., is methanol, ethanol, propanol, or isopropanol.

In an embodiment, the aqueous carrier comprises water, for example deionized water, and less than 10 wt % of an organic solvent, preferably less than 1 wt %, most preferably no organic solvent. In another embodiment the aqueous carrier comprises less than 1 wt %, and is preferably devoid of a halogenated organic solvent. Still further, the aqueous carrier can comprise less than 1 wt %, or be devoid of, a chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing.

The polyimide-forming composition further comprises a surfactant. The surfactant maintains the particulate precursor composition as a suspension in the aqueous carrier. The surfactant can be cationic, anionic, amphoteric, or nonionic.

Preferably, the surfactant is nonionic. Among the nonionic surfactants that can be used are fatty acid amides, in particular those of the formula wherein R is $C_{7-21}$ alkyl or alkenyl group each $R^1$ is independently hydrogen, $C_{1-4}$ alkyl, $C_{1-4}$ hydroxyalkyl, or —$(C_2H_4O)_xH$ wherein x is 1 to 15. Specific fatty acid amides are those wherein R is $C_{8-18}$ alkyl or alkenyl, one $R^1$ is hydrogen and the other $R^1$ is a group of formula —$(C_2H_4O)_xH$ wherein x is 2 to 10.

Other nonionic surfactants include $C_{8-22}$ aliphatic alcohol ethoxylates having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Examples of commercially available nonionic surfactants of this type are Tergitol™ 15-S-9 (a condensation product of $C_{11-15}$ linear secondary alcohol with 9 moles ethylene oxide), Tergitol™ 24-L-NMW (a condensation product of $C_{12-14}$ linear primary alcohol with 6 moles of ethylene oxide) with a narrow molecular weight distribution from Dow Chemical Company. This class of product also includes the Genapol™ brands of Clariant GmbH.

Other nonionic surfactants that can be used include polyethylene, polypropylene and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Commercially available surfactants of this type include Igepal® CO-630, Triton® X-45, X-114, X-100 and X102, Tergitol™ TMN-10, Tergitol® TMN-100×, and Tergitol™ TMN-6 (all polyethoxylated 2,6,8-trimethyl-nonylphenols or mixtures thereof) from Dow Chemical Corporation, and the Arkopal-N products from Hoechst AG.

Still others include the addition products of ethylene oxide with a hydrophobic base formed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG.

The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contain from about 40 to about 80 wt % of polyoxyethylene and has a molecular weight of about 5000 to about 11,000 Daltons. Commercially available examples of this compound class are the Tetronic brands from BASF and the Genapol PN trademarks of Hoechst AG.

Anionic surfactants include the alkali metal, alkaline earth metal, ammonium and amine salts, of organic sulfuric reaction products having in their molecular structure a $C_{8-36}$, or $C_{8-22}$, alkyl group and a sulfonic acid or sulfuric acid ester group. Included in the term alkyl is the alkyl portion of acyl radicals. Examples of are the sodium, ammonium, potassium or magnesium alkyl sulfates, especially those obtained by sulfating the higher alcohols ($C_{8-18}$ carbon atoms) sodium or magnesium alkyl benzene or alkyl toluene sulfonates, in which the alkyl group contains from about 9 to about 15 carbon atoms, the alkyl radical being either a straight or branched aliphatic chain; sodium or magnesium paraffin sulfonates and olefin sulfonates in which the alkyl or alkenyl group contains 10 to about 20 carbon atoms; sodium $C_{10-20}$ alkyl glyceryl ether sulfonates, especially those ethers of alcohols derived from tallow and coconut oil; sodium coconut oil fatty acid monoglyceride sulfates and sulfonates; sodium, ammonium or magnesium salts of ($C_{8-12}$alkyl) phenol ethylene oxide ether sulfates with about 1 to about 30 units of ethylene oxide per molecule; the reaction products of fatty acids esterified with isethionic acid and neutralized with sodium hydroxide where, for example, the fatty acids are derived from coconut oil; sodium or potassium salts of fatty acid amides of a methyl tauride in which the fatty acids, for example, are derived from coconut oil and sodium or potassium beta-acetoxy or beta-acetamido-alkanesulfonates where the alkane has from 8 to 22 carbon atoms.

Among the specific anionic surfactants that can be used are $C_{8-22}$ alkyl sulfates (e.g., ammonium lauryl sulfate, sodium lauryl sulfate, sodium lauryl ether sulfate (SLES), sodium myreth sulfate, and dioctyl sodium sulfosuccinate), $C_{8-36}$ alkyl sulfonates comprising an organic sulfonate anion (e.g., octyl sulfonate, lauryl sulfonate, myristyl sulfonate, hexadecyl sulfonate, 2-ethylhexyl sulfonate, docosyl sulfonate, tetracosyl sulfonate, p-tosylate, butylphenyl sulfonate, dodecylphenyl sulfonate, octadecylphenyl sulfonate, and dibutylphenyl, sulfonate, diisopropyl naphthyl sulfonate, and dibutylnaphthyl sulfonate) and a cation (e.g., phosphonium or ammonium), $C_{8-36}$ perfluoroalkylsulfonates (e.g., perfluorooctanesulfonate (PFOS), perfluorobutanesulfonate), and linear $C_{7-36}$ alkylbenzene sulfonates (LABS) (e.g., sodium dodecylbenzenesulfonate). Alkyl ether sulfates having the formula $RO(C_2H_4O)_xSO_3M$ wherein R is a $C_{8-36}$ alkyl or alkenyl, x is 1 to 30, and M is a water-soluble cation. The alkyl ether sulfates are condensation products of ethylene oxide and monohydric alcohols having from about 10 to about 20 carbon atoms. Preferably, R has 10 to 16 carbon atoms. The alcohols can be derived from natural fats, e.g., coconut oil or tallow, or can be synthetic. Such alcohols are reacted with 1 to 30, and especially 1 to 12, molar proportions of ethylene oxide and the resulting mixture of molecular species is sulfated and neutralized.

Among the cationic surfactants that can be used are of quaternary phosphonium or ammonium type, having one, two, or more chains which contain an average of from 12 to 22, preferably from 16 to 22, more preferably from 16 to 18, carbon atoms. The remaining groups, if any, attached to the quaternary atom are preferably $C_1$ to $C_4$ alkyl or hydroxyalkyl groups. Although it is preferred that the long chains be alkyl groups, these chains can contain hydroxy groups or can contain heteroatoms or other linkages, such as double or triple carbon-carbon bonds, and ester, amide, or ether linkages, as long as each chain falls within the above carbon atom ranges, Examples include cetyltriethylammonium chloride, diethylmethyl-(2-oleoamidoethyl)ammonium methyl sulfate, cetyl trimethylammonium bromide, dimethyl distearyl ammonium chloride, octadecyltrimethylammonium chloride, stearamidopropyldimethyl-fi-hydroxyethylammonium nitrate, stearamidopropyldimethyl-B-hydroxyethylammonium dihydrogen phosphate, N,N-dimethyl-N-benzyl-N-octadecyl ammonium chloride, N,N-dimethyl-N-hydroxyethyl-N-dodecyl ammonium chloride, N,N-dimethyl-N-benzyl-N-octadecenyl ammonium chloride, N,N-dimethyl-N-benzyl-N-dodecyl ammonium chloride, N,N-dimethyl-N-hydroxyethyl-N-benzyl ammonium chloride, hexadecylpyridinium chloride, hexadecyltriethylammonium bromide, octadecylbenzyl trimethylammonium methosulfate, isopropylnaphthyltrimethylammonium chloride, octadecyl pyridinium bromide, I—(Z-hydroxyethyl)-

2-heptadecenyl-1-(4-chlorobutyl) imidazolinium chloride, hexadecylmethylpiperidinium methosulfate, dodecylhydroxyethylmorpholinium bromide, and N-cetyl-N-ethyl morpholinium ethosulfate.

The polyimide-forming compositions can comprise, based on the total weight of the compositions, 1 to 90 weight percent (wt %), preferably 5 to 75 wt %, more preferably 10 to 30 wt % of the particulate polyetherimide precursor composition; 10 to 99 wt %, preferably 25 to 95 wt %, more preferably 70 to 90 wt % of the aqueous carrier, and 0.001 to 10 wt %, preferably 0.05 to 5 wt %, more preferably 0.1 to 2.5 wt % of the surfactant.

The polyimide-forming compositions can further comprise additional components to modify the reactivity or processability of the compositions, or properties of the polyimides and articles formed from the polyimides. Any of these additional components can be present as separate particulates, or precombined with one or both monomers, and the combination formed into the particulates. Preferably, if present as separate particulates, the additional components have a particle size as described for the monomers above.

For example, the polyimide-forming compositions can further comprise a polyimide endcapping agent to adjust the molecular weight of the polyimide. Such endcapping agents are known, and include, for example, monofunctional amines such as aniline and mono-functional anhydrides such as phthalic anhydride, maleic anhydride, or nadic anhydride. The endcapping agents can be present in an amount of 0.2 mole percent to 10 mole percent, more preferably 1 mole percent to 5 mole percent based on total moles of one of the bisanhydride or diamine monomer. In an embodiment, however, no endcapping agent is present in the polyimide-forming compositions.

In another embodiment, the polyimide-forming compositions can further comprise a crosslinking agent for polyimides. Such crosslinking agents are known, and include, compounds containing an amino group or an anhydride group and crosslinkable functionality, for example ethylenic unsaturation. Examples include maleic anhydride and benzophenone tetracarboxylic acid anhydride. The endcapping agents can be present in an amount of 0.2 mole percent to 10 mole percent, more preferably 1 mole percent to 5 mole percent based on total moles of one of the bisanhydride or diamine monomer.

The polyimide-forming compositions can further comprise a particulate polymer dispersable in the aqueous carrier. Imidization of the polyimide precursors in the presence of the particulate polymer can provide an intimate blend of the polymer and the polyimide. The dispersable polymers can have an average particle diameter from 0.01 to 250 micrometers. Aqueous-dispersable polymers include fluoropolymers, (e.g., polytetrafluoroethylene, tetrafluoroethylene-perfluoroalkylvinylether copolymer, tetrafluoroethylene-hexafluoropropylene copolymer, polychlorotrifluoroethylene, tetrafluoroethylene-ethylene copolymer, polyvinylidene fluoride), (meth)acrylic and (meth)acrylate polymers (e.g., poly(methyl (meth)acrylate), poly(ethyl (meth)acrylate), poly(n-butyl (meth)acrylate), poly(2-ethyl hexyl (meth)acrylate), copolymers thereof, and the like), styrenic polymers (e.g., polystyrene, and copolymers of styrene-butadiene, styrene-isoprene, styrene-acrylate esters, and styrene-acrylonitrile), vinyl ester polymers (e.g., poly(vinyl acetate), poly(vinyl acetate-ethylene) copolymers, poly(vinyl proprionate), poly(vinyl versatate) and the like), vinyl chloride polymers, polyolefins (e.g., polyethylenes, polyproplyenes, polybutadienes, copolymers thereof, and the like), polyurethanes, polyesters (e.g., poly (ethylene terephthalate), poly(butylene terephthalate), poly (caprolactone), copolymers thereof, and the like), polyamides, natural polymers such as polysaccharides, or a combination comprising at least one of the foregoing.

When present, the dispersible polymers can be present in an amount of 0.1 to 50 wt %, preferably 1 to 30 wt %, more preferably from 5 to 20 wt %, each based on the total weight of the monomers in the composition.

The polyimide-forming compositions can further comprise additives for using polyimides compositions known in the art, with the proviso that the additive(s) are selected so as to not significantly adversely affect the desired properties of the compositions, in particular formation of the polyimide. Such additives include a particulate filler (such as glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. In general, the additives are used in the amounts generally known to be effective. For example, the total amount of the additive composition (other than any filler) can be 0.001 to 10.0 wt %, or 0.01 to 5 wt %, each based on the total weight of the monomers in the composition.

For example, a combination of a heat stabilizer, mold release agent, and ultraviolet light stabilizer can be used. Pigments, surface effect agents, and nanosized fillers are also specifically contemplated, as such materials can be readily co-dispersed with monomers, or pre-combined with the monomers. When present, the nanosized fillers can be present in an amount of 0.1 to 50 wt %, preferably 1 to 30 wt %, more preferably from 2 to 10 wt %, each based on the total weight of the monomers in the composition.

The polyimide-forming compositions can be manufactured by various methods according to general known techniques. For example, a method of manufacturing the polyimide-forming compositions can include combining the components of the polyimide-forming compositions with agitation or stirring at a temperature and for a period of time effective to suspend the particulates. In a surprising and advantageous feature, it has been found that the suspensions are stable (i.e., resist settling) for a period of days, weeks, or months at room temperature. The suspensions can accordingly be manufactured and readily shipped to the site of use.

The polyimide-forming compositions can be used in the manufacture of articles useful for a wide variety of applications. An article comprising a polyimide can be manufactured from the polyimide-forming compositions by, for example, forming a preform comprising the article from the polyimide-forming compositions, for example by spinning, spraying, casting, coating a substrate, impregnating a porous substrate, coating a surface of a mold, or disposing the polyimide-forming composition in a mold. The preform can accordingly have the form of a fiber, a coating, or a layer. The coatings and layers can have a wide range of thicknesses, for example from 0.1 to 1500 micrometers, or from 1 to 250 micrometers. The thickness can be adjusted by adjusting the amount of solids in the compositions, or by use of a doctor blade or similar device.

The preform is then heated at a temperature and for a period of time effective to imidize the polyimide precursor composition and form the polyimide. Suitable temperatures are from 200 to 400° C., preferably 200 to 350° C., for a time from 10 minutes to 3 hours, preferably 15 minutes to 1 hour.

The imidization can be conducted under an inert gas during the heating. Examples of such gases are dry nitrogen, helium, argon and the like. Dry nitrogen is generally preferred. In an advantageous feature, such blanketing is not required. The imidization is generally conducted at atmospheric pressure.

The aqueous carrier can be removed from the preform during the imidization, or the aqueous carrier can be removed from the preform partially or completely before the imidization, for example by heating to a temperature under the imidization temperature.

If a crosslinker is present in the polyimide-forming composition, crosslinking can occur before the imidization, during the imidization, or after the imidization. For example, when the crosslinker comprises ethylenically unsaturated groups, the preform can be crosslinked by exposure to ultraviolet (UV) light, electron beam radiation or the like, to stabilize the preform. Alternatively, the polyimide can be post-crosslinked to provide additional strength or other properties to the polyimide.

The articles comprising the polyimide can be a fiber, a layer, a conformal coating, a molded article, a membrane, a prepreg, or a composite. For example the polyimides can be used to form thick or thin layers, as fiber sizing, as wire and cable coatings, as cookware and industrial coatings, as powder coatings, and in compression molded parts. One or more additional fabrication operations can be performed on the articles, such as molding, in-mold decoration, baking in a paint oven, vapor metallization, sputtering, hardcoating, lamination, or thermoforming. Those skilled in the art will also appreciate that common curing and surface modification processes such as heat-setting, texturing, embossing, corona treatment, flame treatment, plasma treatment and vacuum deposition can further be applied to the articles to alter surface appearances and impart additional functionalities to the articles.

In some embodiments, the polyimide is a layer, which can be formed by casting or coating the polyimide-forming composition onto a substrate or release layer to form a cast or coated preform layer. Exemplary substrates include natural and synthetic materials, and can be papers, cast films, decorative films, foams, including those of polyurethane, interleaving cards, woven cloths, reverse faces of self-adhesive tapes, self-adhesive films, text-bearing faces of self-adhesive labels, packaging material, cardboard boxes, metal foils, drums, cardboards, plastic films such as glassine paper, Kraft paper, chemical papers, calendered or glazed papers, parchmentized papers or precoated papers, and woven and non-woven fabrics. To provide a thin and uniform layer a dispenser or bath can be used for example a slit nozzle, needle nozzle, valve, spray nozzle, pouring nozzle, air brush, knife, bar (bar coater), blades, doctor blades, metering pumps, cartridges or powered syringes, size presses, film presses or other tools by dipping, brushing, flow coating, trailing blade, inverted blade, SDTA (Short Dwell Time Applicator), roller blade, reverse roll coating, kiss coating, spraying, rolling or printing, by means of an offset gravure-coating apparatus, by (air)-knife or doctor-blade coating or using an airbrush.

The solvent can be removed by evaporation assisted by additional air streams including heated air, heated inert gas like nitrogen or steam heated rolls to better control the temperature of the carrier layer. Imidization can be initiated by heating, for example in an oven, or by heating the preform layer under heat and pressure, for example by laminating the preform layer to another substrate. Very thin layers can be formed, for example layers having a thickness from 0.1 to 1500 micrometers, specifically 1 to 750 micrometers, more specifically 10 to 150 micrometers, and even more specifically 10 to 100 micrometers. Multilayer articles can also be made, by forming the preform layer on a multilayer substrate, or by subsequent metallization, or adhesion or lamination to one or more additional layers. Single or multiple layers of coatings can further be applied to the single or multi-layer polyimide layer to impart additional properties such as scratch resistance, ultraviolet light resistance, aesthetic appeal, lubricity, and biocompatibility. Coatings can be applied through standard application techniques such as rolling, spraying, dipping, brushing, or flow-coating. In an embodiment, the layer can be used as a packaging material, capacitor film, or circuit board layer.

In other embodiments, the polyimide is a conformal coating on a three-dimensional object. The preform coating can be applied by spraying, dipping, powder-spraying, or otherwise disposing the polyimide-forming composition onto a substrate, followed by solvent removal and imidization. Very thin coatings can be formed, for example coatings having a thickness from 0.1 to 1500 micrometers, specifically 5 to 750 micrometers, more specifically 10 to 150 micrometers, and even more specifically 10 to 100 micrometers. In an embodiment, the article is a wire or cable comprising the polyimide coating.

A method of manufacturing a composite article can comprise impregnating a porous base material with the polyimide-forming composition, and subsequently imidizing the composition to form a polyimide coating or filling the porous base material. As used herein, a "porous base material" can be any base material having any size pores or openings that may or may not be interconnected. Thus, a porous base material may be a fibrous preform or substrate other porous material comprising a ceramic, a polymer, a glass, carbon or a combination thereof. For example, the porous base material can be woven or non-woven glass fabric, a fiber glass fabric, or carbon fiber. Removing the solvent from the impregnated porous base material can be achieved by heating, compressing, or heating and compressing the material. The impregnated porous base material can optionally be shaped before or after the imidization, and before or after the solvent removal step. The impregnated porous base material can also be shaped after curing, by thermoforming, for example. The composite article prepared by the above-described method can be in the form of a fiber, a layer, a cast article, a prepreg, a wire coating, a molded article, a compression article, or a reinforced composite article.

In another specific embodiment, the polyimide-forming composition can be used to coat a mold or in compression molding to provide a molded article. Before imidization, an additional material can be inserted into the mold to form a composite molded article.

Depending on the monomers and other materials used in the polyimide-forming compositions, the polyimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyimide has a weight average molecular weight (Mw) of 1,000 to 150,000 grams/mole (Daltons), as measured by gel permeation chromatography, using polystyrene standards. In some embodiments the polyimide has an Mw of 10,000 to 80,000 Daltons, specifically greater than 10,000 Daltons or greater than 60,000 Daltons, up to 100,000 or 150,000 Daltons.

The polyimides are further characterized by the presence of the surfactant, for example from 0.001 to 10 wt % of the surfactant, preferably a nonionic surfactant. In addition, the polyetherimides have less than 1 wt %, or less than 0.1 wt % of an organic solvent, and preferably the polyimide is devoid of an organic solvent. Such properties are particularly useful in layers or conformal coatings having a thickness from 0.1 to 1500 micrometers, specifically 1 to 500 micrometers, more specifically 5 to 100 micrometers, and even more specifically 10 to 50 micrometers.

The polyimide-forming composition, articles prepared therefrom, and methods of manufacturing are further illustrated by the following non-limiting examples.

EXAMPLES

A. Mechanical Grinding of Monomers:

Monomers are generally friable due to lower molecular weight. The monomers which can make the corresponding polyimide can be ground to less than 45 micrometer particle size using mechanical grinding optionally equipped with liquid nitrogen cooling. In the examples, dianhydride monomers (4,4'-bisphenol A dianydride [4,4'-BPA-DA], 3,3'-bisphenol A dianhydride [3,3'-BPA-DA], 4,4'oxydiphthalic anhydride [4,4'-ODPA] and biphenylether dianhydride [BPEDA]) and diamine monomers (4,4'-diaminodiphenyl sulfone [4,4'-DDS] and 4,4'-oxydianiline [4,4'-ODA]) were ground using a lab scale mechanical grinder and sieved through a 45 micron classifier.

B. Making Aqueous Dispersion:

Equimolar amounts of the monomers as shown in Table 1 were taken and mixed well. Deionized water and a non-ionic surfactant (Tergitol TMN-10) were added to the monomer powder mix. Sonication of the mixture resulted in an aqueous slurry of monomers which was stable for weeks.

TABLE 1

| Example No. | Dianhydride Monomer (grams) | Diamine Monomer (grams) | DI water (grams) | Tergitol TMN10 (grams) |
|---|---|---|---|---|
| 1 | 4,4'-BPA-DA (2.00) | 4,4'-DDS (0.954) | 10 | 0.06 |
| 2 | 3,3'-BPA-DA (2.00) | 4,4'-DDS (0.954) | 10 | 0.06 |
| 3 | 4,4'-ODPA (1.1919) | 4,4'-DDS (0.954) | 10 | 0.06 |
| 4 | 4,4'-ODPA (1.1919) | 4,4'-ODA (0.7694) | 10 | 0.06 |
| 5 | BPEDA (1.8382) | 4,4'-DDS (0.954) | 10 | 0.06 |

C. Making Coating or Film:

The above aqueous dispersions were spread in a glass plate to make a preform coating using a metal wire rod. The thickness of the wet coating can be controlled by using appropriate wire rod. The thickness of the dry coating or film can be controlled by the solids percent in the aqueous dispersion. For these examples, a 30 micrometer wire rod was used. After the preform coating was made, the glass plates were placed in an oven programmed to go from room temperature to 350° C. at the rate of 30° C./min and held at 350° C. for 15 minutes. After this, the oven was cooled to room temperature at the rate of 30° C./min. During this heating and cooling process, the oven was blanketed with a nitrogen atmosphere. The glass plates were taken out and immersed in de-ionized water for one or two days for removing the protective coating/films.

D. Molecular Weight and Stoichiometric Analysis of the Final Polymer Coating/Films:

0.015 grams of polymer film was dissolved in 10 milliliters of methylene chloride. For polymer films which did not dissolve in methylene chloride (examples 3 and 5 in Table 1), a 50:50 (volume) mixture of hexafluoroisopropyl alcohol and methylene chloride was used to dissolve the polymer film. A 10 microliter aliquot of each polymer solution was analyzed in GPC (Gel Permeation Chromatography). The weight average molecular weight (Mw), the number average molecular weight (Mn), and the dispersity (PDI) of the polymer was reported using polystyrene as standard as shown in Table 2.

The stoichiometric analysis of excess amine or excess anhydride was measured via Fourier Transform Infrared Spectroscopy (FT-IR). The excess amine and/or anhydride is reported in mole percent (mol %) and this could include both mono-functional monomer (where the other end is part of the polymer film) as well as di-functional monomer. Results are shown in Table 2.

TABLE 2

| Example No. | Mw of final polymer coating/film | Mn of final polymer coating/film | PDI of final polymer coating/film | amine end groups, mol % | anhydride end groups, mol % |
|---|---|---|---|---|---|
| 1 | 88168 | 37845 | 2.32 | 0.10% | 0.13% |
| 2 | 56044 | 24,840 | 2.256 | 0.959 | N/A |
| 3 | 8266 | 5650 | 1.463 | | |
| 4 | 76940 | 32982 | 2.33 | | |
| 5 | 22413 | 12502 | 1.793 | | |

The stoichiometry of the final films from examples 1 and 2 as analyzed by FT-IR shows relatively low amine and anhydride end groups, as shown in Table 2.

The polyimide-forming composition, articles prepared therefrom, and methods of manufacturing are further illustrated by the following embodiments, which are non-limiting.

Embodiment 1

A polyimide-forming composition, comprising a particulate polyimide precursor composition having an average particle size of 0.1 to 100 micrometers wherein the polyimide precursor composition comprises a substituted or unsubstituted $C_{4-40}$ bisanhydride, and a substituted or unsubstituted divalent $C_{1-20}$ diamine; an aqueous carrier; and a surfactant.

Embodiment 2

The polyimide-forming composition of embodiment 1, wherein 100% of the particulate polyimide precursor composition has a particle size of 0.1 to 100 micrometers, preferably 0.1 to 80 micrometers, more preferably 0.1 to 65 micrometers.

Embodiment 3

The polyimide-forming composition of embodiments 1 or 2, wherein the particulate polyimide precursor composition comprises separate particles of the bisanhydride and the diamine.

Embodiment 4

The polyimide-forming composition of any one or more of embodiments 1 to 3, wherein a mole ratio of the bisanhydride to the diamine is 1:1 to 1:1.3.

Embodiment 5

The polyimide-forming composition of any one or more of embodiments 1 to 3, wherein a mole ratio of the diamine to the bisanhydride is 1:1 to 1:1.3.

Embodiment 6

The polyimide-forming composition of any one or more of embodiments 1 to 5 wherein the bisanhydride is of the formula

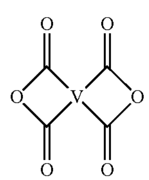

wherein V is a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or halogenated derivative thereof, and the diamine is of the formula $H_2N—R—NH_2$ wherein R is a substituted or unsubstituted $C_{6-20}$ aromatic hydrocarbon group or a halogenated derivative thereof, a substituted or unsubstituted, straight or branched chain, saturated or unsaturated $C_{2-20}$ alkylene group or a halogenated derivative thereof, a substituted or unsubstituted $C_{3-8}$ cycloalkylene group or halogenated derivative thereof.

Embodiment 7

The polyimide-forming composition of any one or more of embodiments 1 to 5, wherein the bisanhydride is of the formula

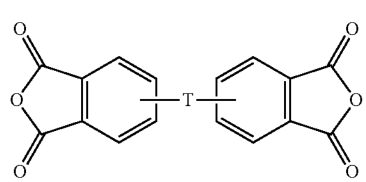

wherein T is —O— or a group of the formula —O—Z—O— wherein the divalent bonds of the —O— or the —O—Z—O— group are in the 3,3',3,4',4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing; and the diamine is of the formula $H_2N—R—NH_2$ wherein R is a divalent group of any of the formulas

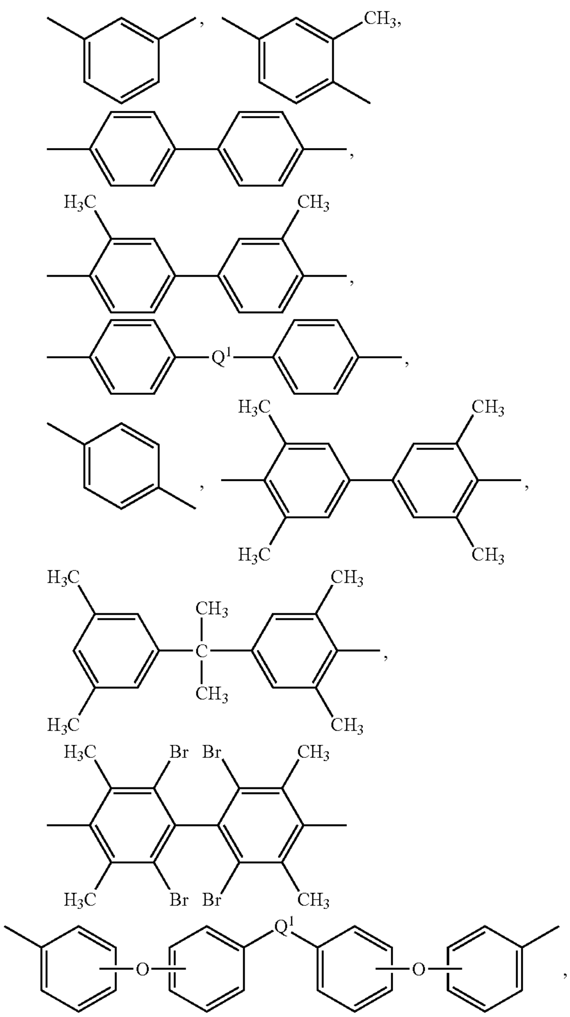

wherein $Q^1$ is —O—, —S—, —C(O)—, —$SO_2$—, —SO—, —$C_yH_{2y}$— and a halogenated derivative thereof wherein y is an integer from 1 to 5, or —$(C_6H_{10})_z$— wherein z is an integer from 1 to 4.

Embodiment 8

The polyimide-forming composition embodiment 7, wherein Z is a group derived from a dihydroxy compound of the formula

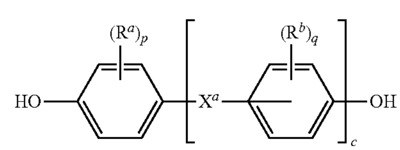

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —$SO_2$—, —C(O)—, or a $C_{1-18}$ organic bridging group.

Embodiment 9

The polyimide-forming composition of embodiment 8, wherein each R is independently meta-phenylene, para-phenylene, or a combination comprising at least one of the foregoing, and the Z is 4,4'-diphenylene isopropylidene.

Embodiment 10

The polyimide-forming composition of any one or more of embodiments 6 to 9, wherein at least 10 mole percent of the R groups comprise a sulfone group, preferably wherein R is 4,4'-diphenylene sulfone and Z is 4,4'-diphenylene isopropylidene.

Embodiment 11

The polyimide-forming composition of any one or more of embodiments 1 to 10, wherein the aqueous carrier comprises less than 5 wt % of an organic solvent, preferably less than 1 wt %, most preferably no organic solvent.

Embodiment 12

The polyimide-forming composition of any one or more of embodiments 1 to 11, wherein the aqueous carrier comprises less than 1 wt % of a chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing.

Embodiment 13

The polyimide-forming composition of any one or more of embodiments 1 to 11, wherein the aqueous carrier comprises up to 5 wt % of an organic solvent, wherein the organic solvent is a protic or nonprotic organic solvent.

Embodiment 14

The polyimide-forming composition of any one or more of embodiments 1 to 13, wherein the surfactant is nonionic.

Embodiment 15

The polyimide-forming composition of embodiment 14, wherein the surfactant is a $C_{8-22}$ aliphatic alcohol ethoxylates having about 1 to about 25 mol of ethylene oxide, preferably a $C_{10-20}$ aliphatic alcohol ethoxylates having about 2 to about 18 mol of ethylene oxide.

Embodiment 16

The polyimide-forming composition of any one or more of embodiments 1 to 15, comprising, based on the total weight of the composition, 1 to 90 wt %, preferably 5 to 75 wt %, more preferably 10 to 30 wt % of the particulate polyetherimide precursor composition; 10 to 99 via, preferably 25 to 95 wt %, more preferably 70 to 90 wt % of the aqueous carrier, and 0.001 to 10 wt %, preferably 0.05 to 5 wt %, more preferably 0.1 to 2.5 wt % of the surfactant.

Embodiment 17

The polyimide-forming composition of any one or more of embodiments 1 to 16, further comprising a polyimide endcapping agent.

Embodiment 18

The polyimide-forming composition of any one or more of embodiments 1 to 17, further comprising a polyimide crosslinking agent.

Embodiment 19

The polyimide-forming composition of any one or more of embodiments 1 to 18, further comprising a particulate polymer having an average particle diameter from 0.1 to 250 micrometers.

Embodiment 20

The polyimide-forming composition of any one or more of embodiments 1 to 19, further comprising a pigment, a nanosized filler, or a combination comprising at least one of the foregoing.

Embodiment 21

A method of manufacturing an article comprising a polyimide, the method comprising forming a preform comprising the polyimide-forming composition of any one or more of embodiments 1 to 20; and heating the preform at a temperature and for a period of time effective to imidize the polyimide precursor composition and form the polyimide.

Embodiment 22

The method of embodiment 21, wherein the forming is by spinning, spraying, casting, coating a surface of a substrate, impregnating a porous substrate, coating a surface of a mold, or disposing the polyimide-forming composition in a mold.

Embodiment 23

The method of embodiments 21 or 22, further comprising removing the aqueous carrier from the preform before the heating to imidize the polyimide precursor composition.

Embodiment 24

The method of embodiments 21 or 22, further comprising removing the aqueous carrier during the heating to imidize the polyimide precursor composition.

Embodiment 25

The method of any one or more of embodiments 21 to 24, further comprising crosslinking the polyetherimide before or during the imidizing.

Embodiment 26

The method of any one or more of embodiments 21 to 24, further comprising crosslinking the polyetherimide after the imidizing.

Embodiment 27

The method of any one or more of embodiments 21 to 26, wherein the article comprising the polyimide is a fiber, a layer, a conformal coating, a composite article, a composite molded article, or a molded article.

Embodiment 28

The method of any one or more of embodiments 21 to 27, wherein the polyimide has a weight average molecular weight of greater than 5000 Daltons, or greater than 60,000 Daltons.

Embodiment 29

The method of any one or more of embodiments 21 to 28, wherein the polyimide has less than 1 wt %, or less than 0.1 wt % of an organic solvent, preferably wherein the polyimide is devoid of an organic solvent.

Embodiment 30

A layer or coating comprising a polyimide and from 0.001 to 5 wt % of a surfactant.

Embodiment 31

The layer or coating of embodiment 30, having a thickness 0.1 to 1500 micrometers, specifically 1 to 750 micrometers, more specifically 10 to 150 micrometers, and even more specifically 10 to 100 micrometers.

In general, the polyimide-forming composition, articles prepared therefrom, and methods of manufacturing can alternatively comprise, consist of, or consist essentially of, any appropriate components herein disclosed. The polyimide-forming composition, articles prepared therefrom, and methods of manufacturing can additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments.

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or propylene ($—(CH_2)_3—$)). "Cycloalkylene" means a divalent cyclic alkylene group, $—C_nH_{2n-x}$, wherein x is the number of hydrogens replaced by cyclization(s). The prefix "halo" means a group or compound including one more of a fluoro, chloro, bromo, iodo, and astatino substituent. A combination of different halo groups (e.g., bromo and fluoro) can be present. In an embodiment only chloro groups are present. The prefix "hetero" means that the compound or group includes at least one ring member that is a heteroatom (e.g., 1, 2, or 3 heteroatom(s)), wherein the heteroatom(s) is each independently N, O, S, or P. "Substituted" means that the compound or group is substituted with at least one (e.g., 1, 2, 3, or 4) substituents independently selected from a $C_{1-9}$ alkoxy, a $C_{1-9}$ haloalkoxy, a nitro ($—NO_2$), a cyano (—CN), a $C_{1-6}$ alkyl sulfonyl ($—S({=}O)_2$-alkyl), a $C_{6-12}$ aryl sulfonyl ($—S({=}O)_2$-aryl) a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

I claim:

1. A polyimide-forming composition, comprising a particulate polyimide precursor composition having a maximum particle size of 100 micrometers or less, wherein the polyimide precursor composition comprises a substituted or unsubstituted $C_{4-40}$ bisanhydride, and a substituted or unsubstituted divalent $C_{1-20}$ diamine;

an aqueous carrier, wherein the aqueous carrier comprises less than 1 wt % of a chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing; and a surfactant.

2. The polyimide-forming composition of claim 1, particulate polyimide precursor composition has a D100 particle size of 75 micrometers or 45 micrometers.

3. The polyimide-forming composition of claim 1, wherein the particulate polyimide precursor composition comprises separate particles of the bisanhydride and the diamine.

4. The polyimide-forming composition of claim 1, wherein a mole ratio of the bisanhydride to the diamine is 1:1 to 1:1.3.

5. The polyimide-forming composition of claim 1, wherein a mole ratio of the diamine to the bisanhydride is 1:1 to 1:1.3.

6. The polyimide-forming composition of claim 1, wherein the aqueous carrier comprises up to 5 wt % of an organic solvent, wherein the organic solvent is a protic or nonprotic organic solvent.

7. The polyimide-forming composition of claim 1, wherein the surfactant is nonionic.

8. The polyimide-forming composition of claim 1, comprising, based on the total weight of the composition, 1 to 90 wt % of the particulate polyetherimide precursor composition;

10 to 99 wt % of the aqueous carrier, and 0.001 to 10 wt % of the surfactant.

9. The polyimide-forming composition of claim 1, further comprising a polyimide endcapping agent, a polyimide crosslinking agent, or both.

10. The polyimide-forming composition of claim 1, further comprising a particulate polymer having an average particle diameter from 0.1 to 250 micrometers, a pigment, a nanosized filler, or a combination comprising at least one of the foregoing.

* * * * *